US 9,021,378 B2

(12) United States Patent
Kim et al.

(10) Patent No.: US 9,021,378 B2
(45) Date of Patent: Apr. 28, 2015

(54) MOBILE TERMINAL AND METHOD FOR CONTROLLING VIRTUAL KEY PAD THEREOF

(75) Inventors: Kanghee Kim, Seoul (KR); Wonyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 13/070,590

(22) Filed: Mar. 24, 2011

(65) Prior Publication Data

US 2012/0030604 A1 Feb. 2, 2012

(30) Foreign Application Priority Data

Jul. 28, 2010 (KR) ........................ 10-2010-0072743

(51) Int. Cl.
*G06F 3/0488* (2013.01)

(52) U.S. Cl.
CPC .................................. *G06F 3/04886* (2013.01)

(58) Field of Classification Search
CPC ..... G06F 3/016; G06F 1/1626; G06F 3/0238; G06F 3/0488; G06F 9/4446; G06F 9/4443; G06F 3/0481; G06F 9/44543; G06F 3/0482; G06F 3/04883
USPC ......... 715/702, 744, 764, 765, 810, 863, 864, 715/866, 773; 345/456, 169, 172, 173, 156
See application file for complete search history.

(56) References Cited

U.S. PATENT DOCUMENTS

| | | | |
|---|---|---|---|
| 6,073,036 A * | 6/2000 | Heikkinen et al. .......... 455/550.1 |
| 6,169,538 B1 * | 1/2001 | Nowlan et al. ................ 345/168 |
| 8,232,973 B2 * | 7/2012 | Kocienda et al. ............. 345/173 |
| 2002/0180708 A1 * | 12/2002 | Kaelbling ..................... 345/169 |
| 2006/0053387 A1 * | 3/2006 | Ording ......................... 715/773 |
| 2009/0193361 A1 * | 7/2009 | Lee et al. ...................... 715/810 |
| 2010/0103127 A1 * | 4/2010 | Park et al. .................... 345/173 |
| 2010/0185989 A1 * | 7/2010 | Shiplacoff et al. ............ 715/856 |
| 2010/0287154 A1 * | 11/2010 | Tee et al. ...................... 707/708 |
| 2011/0018812 A1 * | 1/2011 | Baird ............................ 345/173 |
| 2011/0050583 A1 * | 3/2011 | Tho ............................. 345/169 |
| 2011/0115722 A1 * | 5/2011 | Mok ............................. 345/173 |
| 2011/0214053 A1 * | 9/2011 | Scott et al. .................... 715/259 |
| 2011/0248941 A1 * | 10/2011 | Abdo et al. ................... 345/173 |
| 2011/0254865 A1 * | 10/2011 | Yee et al. ...................... 345/661 |
| 2012/0069027 A1 * | 3/2012 | Yamazaki et al. ........ 345/472.3 |
| 2012/0293556 A1 * | 11/2012 | Kim et al. ..................... 345/660 |

FOREIGN PATENT DOCUMENTS

WO WO 2007/084078 * 7/2007 ............. H04M 1/02

* cited by examiner

*Primary Examiner* — Xiomar L Bautista
(74) *Attorney, Agent, or Firm* — Ked & Associates, LLP

(57) ABSTRACT

A mobile terminal and a method for controlling a virtual key pad thereof are disclosed. The mobile terminal identifies a touch pattern of a touch action of each of a plurality of virtual keys, and changes at least one of an area and position of a sensing zone corresponding to each of the plurality of virtual keys to correspond to the identified touch pattern.

14 Claims, 26 Drawing Sheets

FIG. 2

| 1 | 2 | 3 |
|---|---|---|
| 4 | 5 | 6 |
| 7 | 8 | 9 |
| * | 0 | # |

310

| First zone | Second zone | Third zone |
|---|---|---|
| Fourth zone | Fifth zone | Sixth zone |
| Seventh zone | Eighth zone | Ninth zone |
| Tenth zone | Eleventh zone | Twelfth zone |

| | 310 | |
|---|---|---|
| 1 | 2 | 3 |
| 4 | 5 | 6 |
| 7 | 8 | 9 |
| * | 0 | # |

(a)

| | 320 | |
|---|---|---|
| First zone | Second zone | Third zone |
| Fourth zone | Fifth zone | Sixth zone |
| Seventh zone | Eighth zone | Ninth zone |
| Tenth zone | Eleventh zone | Twelfth zone |

(b)

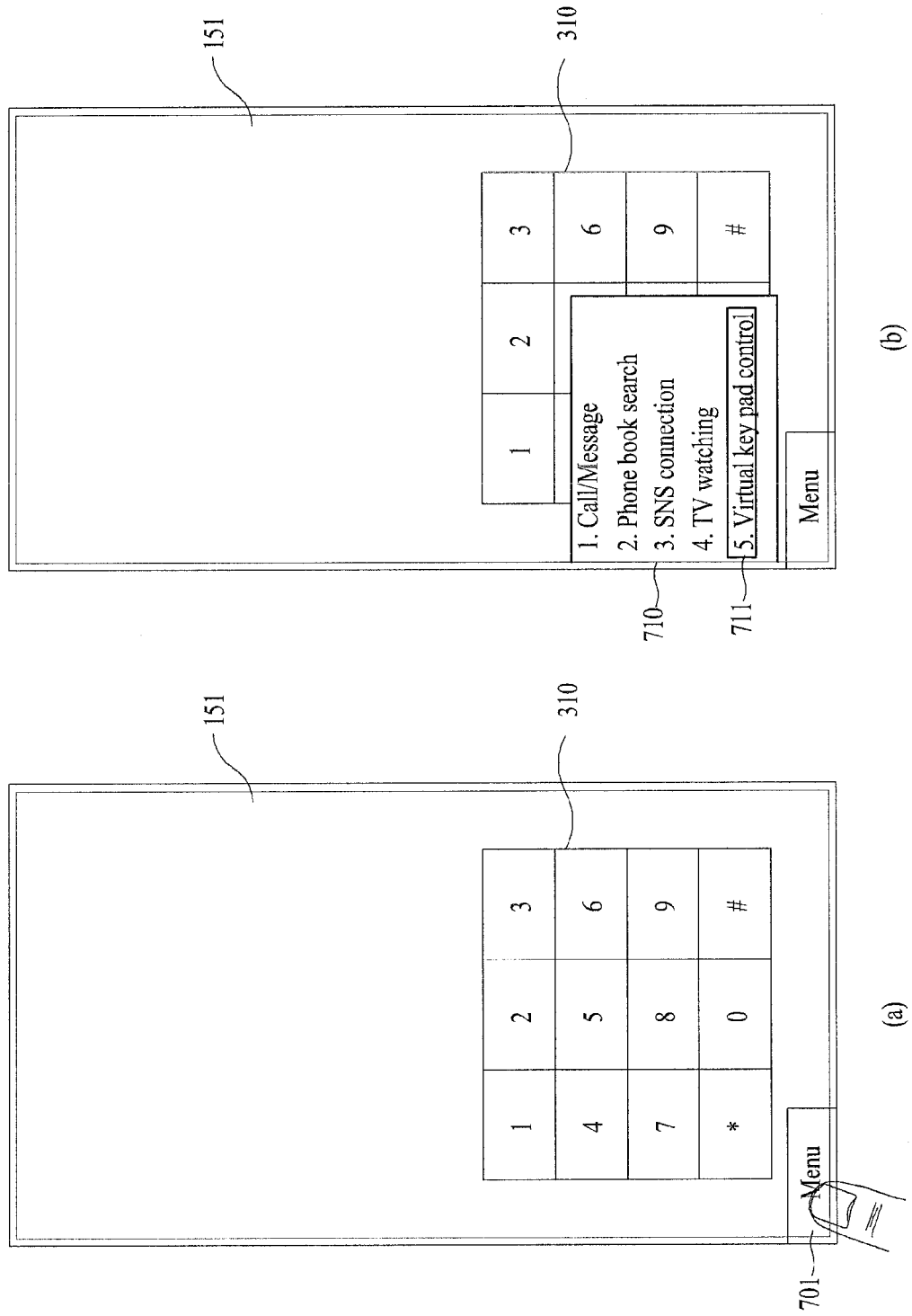

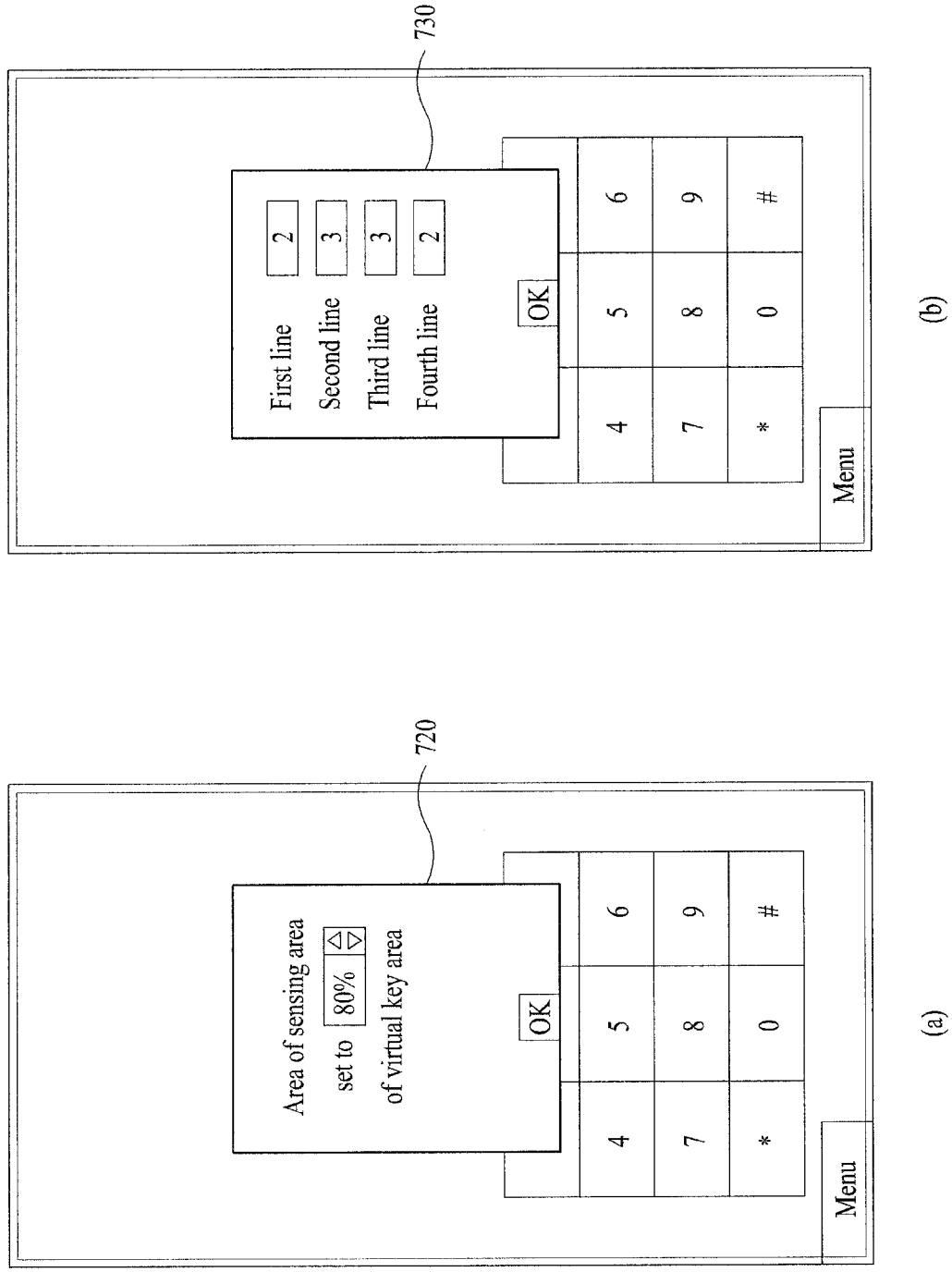

(a)

(b)

(a)

(b)

(a)

(b)

MOBILE TERMINAL AND METHOD FOR CONTROLLING VIRTUAL KEY PAD THEREOF

This application claims the benefit of the Korean Patent Application No. 10-2010-0072743, filed on Jul. 28, 2010, which is hereby incorporated by reference as if fully set forth herein.

BACKGROUND OF THE INVENTION

1. Field of the Invention

The present invention relates to a mobile terminal that can input key data by using a virtual key pad and a method for controlling a virtual key pad thereof.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Generally, a mobile terminal provided with a touch screen includes a display zone and a sensing zone of a virtual key pad, wherein an individual sensing zone corresponding to each of a plurality of virtual keys included in the virtual key pad has the same area as a display area of the corresponding virtual key. Moreover, if neighboring virtual keys are displayed to be touched with each other, their sensing zones are provided to be touched with each other.

According to the related art as described above, a problem occurs in that a touch pattern of a user is not considered in respect of the virtual keys as the individual sensing zones of the virtual keys are uniformly reflected.

In addition, if a point between neighboring virtual keys is touched, key data corresponding to any one of the neighboring virtual keys are generated automatically. In this case, a problem occurs in that key data, which are not desired by the user, may be generated.

SUMMARY OF THE INVENTION

Accordingly, the present invention is directed to a mobile terminal and a method for controlling a virtual key pad thereof, which substantially obviate ones or more problems due to limitations and disadvantages of the related art.

An object of the present invention is to provide a mobile terminal and a method for controlling a virtual key pad thereof, in which a sensing zone corresponding to a virtual key pad is set considering a touch pattern of a user.

Another object of the present invention is to provide a mobile terminal and a method for controlling a virtual key pad thereof, in which a display area of a virtual key is different from an area of a corresponding sensing zone.

Other object of the present invention is to provide a mobile terminal and a method for controlling a virtual key pad thereof, in which no key data are generated if a point between neighboring virtual keys is touched.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention comprises a touch screen displaying a virtual key pad including a plurality of virtual keys, and having a sensing zone corresponding to each of the plurality of virtual keys to sense a touch action of each of the plurality of virtual keys; and a controller identifying a touch pattern of the touch action of each of the plurality of virtual keys and changing at least one of an area and position of the sensing zone corresponding to each of the plurality of virtual keys to correspond to the identified touch pattern.

In this case, at least one of the area and position of the sensing zone is different from at least one of an area and position of a corresponding virtual key.

In another aspect of the present invention, a method for controlling a virtual key pad of a mobile terminal comprises the steps of displaying a virtual key pad including a plurality of virtual keys; setting a sensing zone corresponding to each of the plurality of virtual keys to sense a touch action of each of the plurality of virtual keys; identifying a touch pattern of the touch action of each of the plurality of virtual keys if the touch action is input; and changing at least one of an area and position of the sensing zone corresponding to each of the plurality of virtual keys to correspond to the identified touch pattern.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 and FIG. 2 are diagrams illustrating a general virtual key pad and its sensing zone;

FIG. 3 and FIG. 4 are diagrams illustrating a virtual key pad and its sensing zone according to one embodiment of the present invention;

FIG. 7A to FIG. 7D are screen schematic views illustrating that a sensing area is set in accordance with a user selection action according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The suffixes 'module' and 'unit' for the elements used in the following description are given or used in common by considering facilitation in writing this disclosure only but fail to have meanings or roles discriminated from each other.

First of all, examples of mobile terminals described in this disclosure can include a mobile phone, a smart phone, a laptop computer, a digital broadcast terminal, a PDA (personal digital assistants), a PMP (portable multimedia player), and a navigation system.

Except a case applicable to a mobile terminal only, it will be apparent to those skilled in the art that the configurations according to an embodiment described in this disclosure is applicable to a stationary terminal such as a digital TV, a desktop computer and the like.

Figure 1:
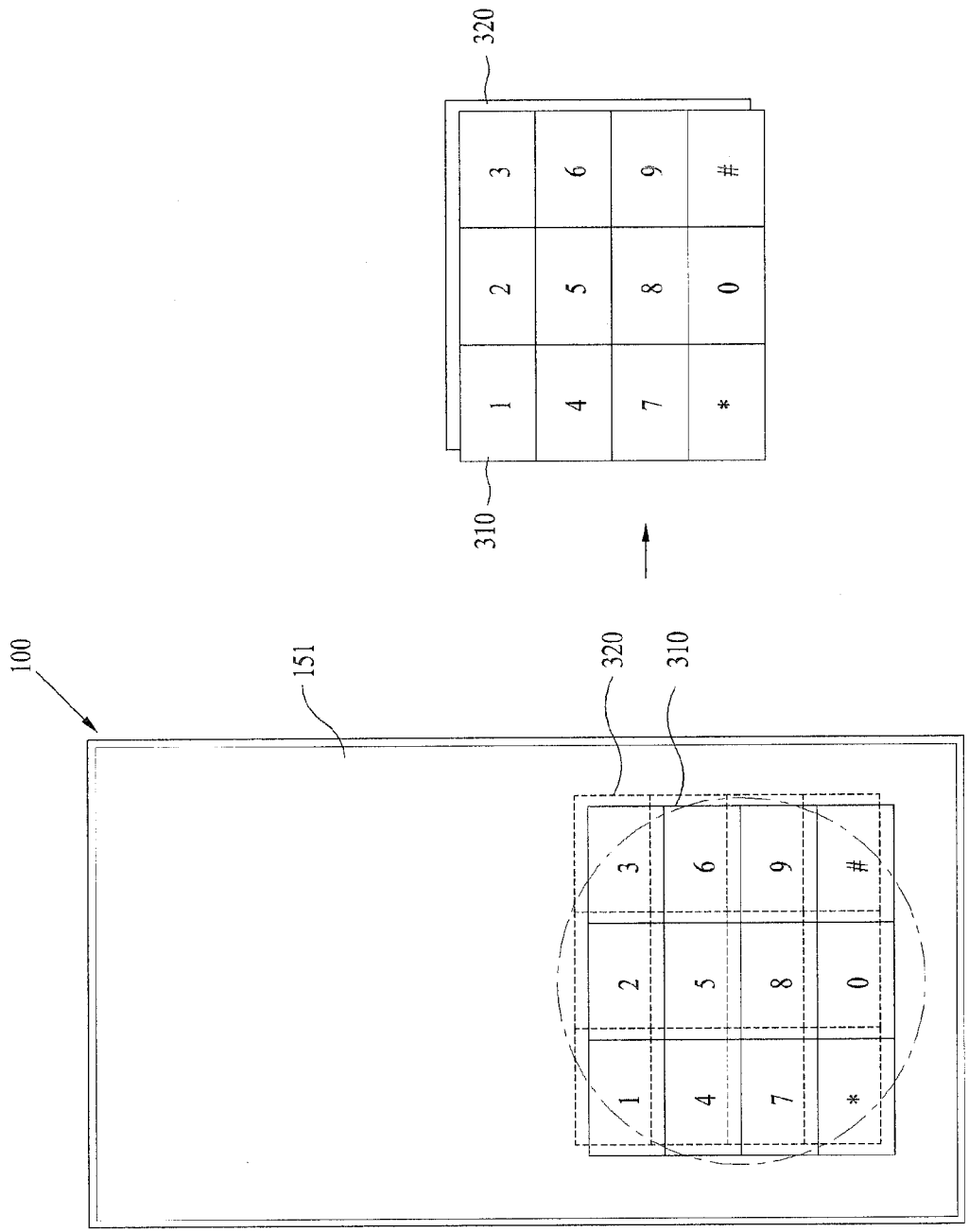

FIG. 1 and FIG. 2 are diagrams illustrating a general virtual key pad and its sensing zone.

For convenience of description, a reference numeral 100 will be given to a mobile terminal, a reference numeral 150 will be given to a touch screen, a reference numeral 310 will be given to a virtual key pad 310, and a reference numeral 320 will be given to a sensing zone.

As illustrated in FIG. 1, the mobile terminal 100 includes a touch screen 151 that can perform a display function and a user input function together, and can display a virtual key pad 310 on the touch screen 151.

In this case, the virtual key pad 310 includes a plurality of virtual keys, wherein numbers, texts, symbols, etc. can be allocated to each of the virtual keys. Also, if the mobile terminal 100 receives user touch on a specific virtual key, it can generate key data corresponding to the specific virtual key. Also, the virtual key pad 310 can be displayed selectively depending on user selection or a terminal use state.

The mobile terminal 100 can include a sensing zone 320 to sense a touch action on each of the plurality of virtual keys included in the virtual key pad 310.

In this case, the sensing zone 320 is located below or above the virtual key pad 310 to form a layered structure with the virtual key pad 310.

In more detail, the touch screen 151 includes a display module and a touch module, and can display the virtual key pad 310 by using the display module and operate the sensing zone 320 by using the touch module.

FIG. 2 illustrates a structure of each of a general virtual key pad 310 and a general sensing zone 320.

Referring to FIG. 2, a display area of the virtual key pad 310 may be the same as an area of the sensing zone 320. The sensing zone 320 can include a plurality of individual sensing zones (first sensing zone to twelfth sensing zone) corresponding to each of a plurality of virtual keys (first key to # key) included in the virtual key pad 310.

Also, an area of the individual sensing zone may be the same as a display area of a corresponding virtual key. For example, a display area of the first key may be the same as an area of the first sensing zone corresponding to the first key.

Also, since the plurality of individual sensing zones are provided to touched with one another, if a point between the first and second virtual keys is touched, key data corresponding to any one of the first and second virtual keys can be generated.

Figure 3:
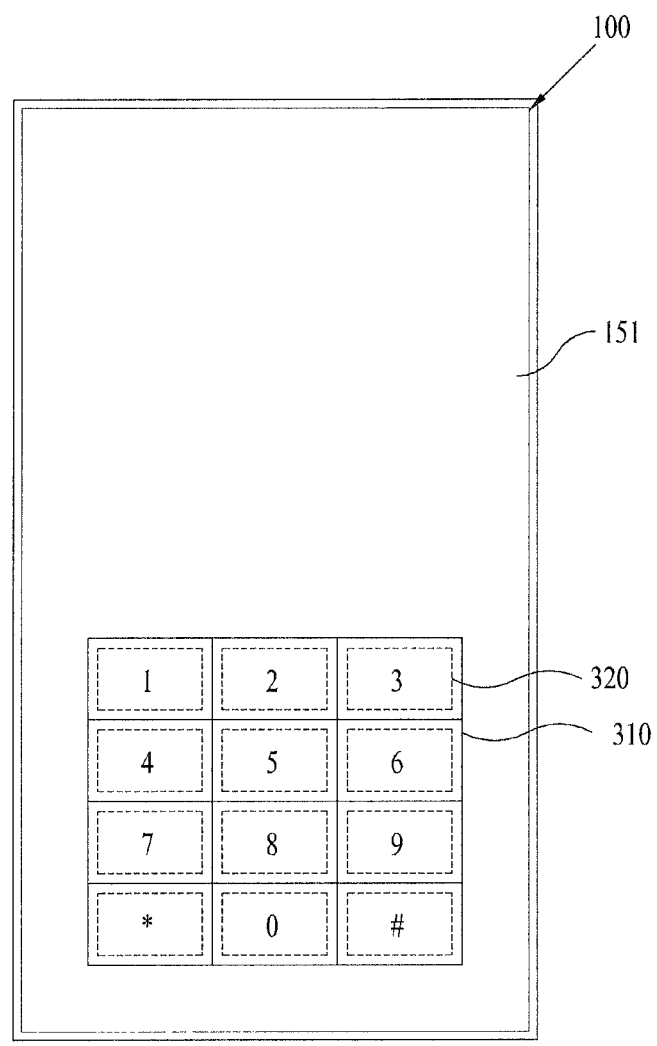

FIG. 3 is a diagram illustrating a virtual key pad 310 and its sensing zone 320 provided in a mobile terminal according to one embodiment of the present invention.

As illustrated in FIG. 3, the mobile terminal 100 displays a virtual key pad 310 on a touch screen 151, and includes a sensing zone 320 to form a layered structure with the virtual key pad 310.

In this case, the sensing zone 320 can include a plurality of individual sensing zones corresponding to each of a plurality of virtual keys included in the virtual key pad 310. Also, an area of the individual sensing zone may be different from that of a corresponding virtual key. For example, the area of the individual sensing zone may be 80% of that of the corresponding virtual key.

FIG. 4 is a diagram illustrating a structure of each of a virtual key pad 310 and its sensing zone 320 according to one embodiment of the present invention.

Referring to FIG. 4, a display area of each of a plurality of virtual keys included in the virtual key pad 310 may be different from an area of a corresponding sensing zone.

For example, a display area of the first key may be different from an area of its sensing zone, i.e., the first sensing zone. In more detail, the area of the first sensing zone may be 80% of the display area of the first key.

Moreover, area rates of sensing zones corresponding virtual keys may be different from one another.

For example, an area rate of the first sensing zone to the first key may be 80%, and an area rate of the second sensing zone to the second key may be 70%.

Also, since the plurality of individual sensing zones are provided so as not to be touched with one another, if a point between the first and second neighboring virtual keys is touched, key data corresponding to any one of the first and second virtual keys may not be generated (described later in more detail).

Figure 5:
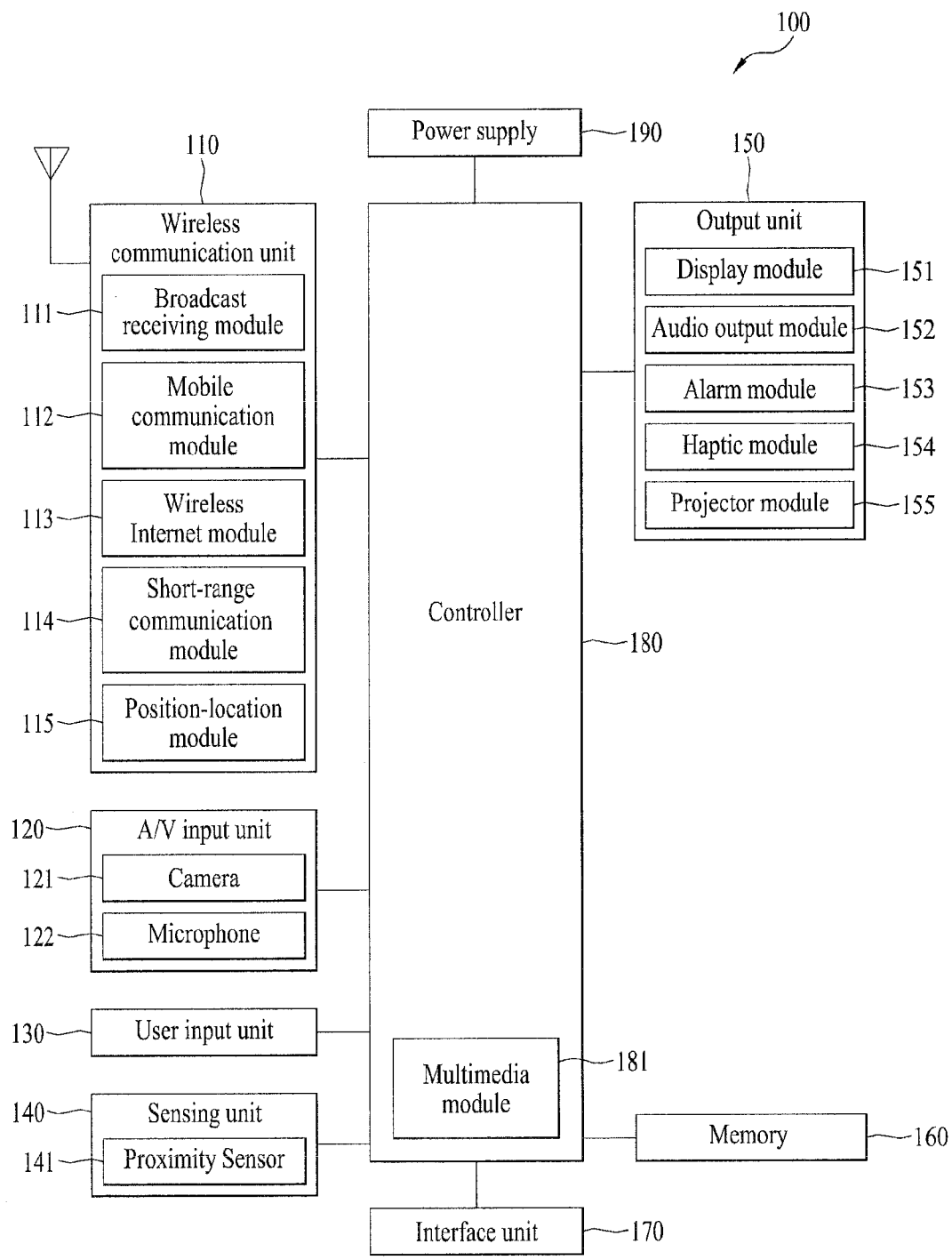
FIG. 5 is a block diagram illustrating a mobile terminal according to one embodiment of the present invention.

FIG. 5 is a block diagram of a mobile terminal according to one embodiment of the present invention.

Referring to FIG. 5, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 5 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-information module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only) (MediaFLO®) and integrated services digital broadcast-terrestrial (ISDB-T). Optionally, the broadcast receiving module 111 can be configured suitable for other broadcasting systems as well at the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-information module 115 identifies or otherwise obtains the location of the mobile terminal 100. If desired, this module may be implemented with a global positioning system (GPS) module.

Referring to FIG. 5, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 5, a proximity sensor (not shown in the drawing) can be provided to an internal area of the mobile terminal 100 enclosed by the touchscreen or around the touchscreen. The proximity sensor is the sensor that detects a presence or non-presence of an object approaching a pre-scribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Figure 6:
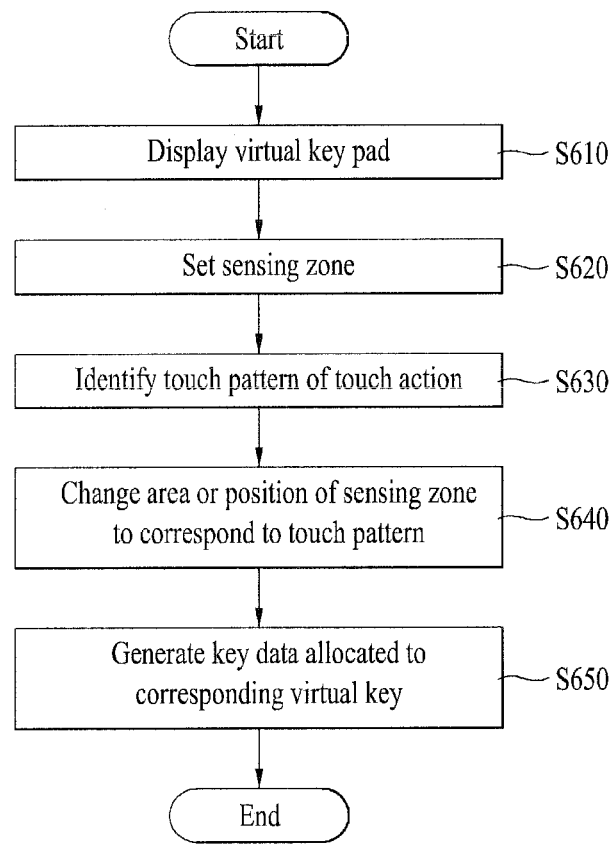
FIG. 6 is a flow chart illustrating a method for controlling a virtual key pad of a mobile terminal according to one embodiment of the present invention.

FIG. 6 is a flow chart illustrating a method for controlling a virtual key pad of a mobile terminal according to one embodiment of the present invention.

As illustrated in FIG. 6, the mobile terminal 100 displays the virtual key pad on the touch screen 151 under the control of the controller 180 (S610).

As described above, the virtual key pad includes a plurality of virtual keys to which corresponding key data are allocated.

If a display command signal of the virtual key pad is input from the user, or if the current use state of the mobile terminal needs data input through key manipulation, the controller 180 can display the virtual key pad.

For example, the display command signal of the virtual key pad can be input as a menu item, a key zone or a virtual key corresponding to the virtual key pad display is selected by the user. Also, the state that needs data input through key manipulation can include a message drafting state, a phone book search state, and a schedule drafting state.

For example, the virtual key pad can include an English virtual key pad, a Korean virtual key pad, a Japanese virtual key pad, a number virtual key pad, and a symbol virtual key pad.

The mobile terminal 100 sets a sensing zone for sensing a touch action of each of a plurality of virtual keys included in the displayed virtual key pad under the control of the controller 180 (S620).

As illustrated in FIG. 6, the step S620 may be performed after the step S610, or may be performed before the step S610.

As described with reference to FIG. 3 and FIG. 4, individual sensing zones are set in the plurality of virtual keys, and their respective area may be different from an area of a corresponding virtual key. In more detail, the area of each of the individual sensing zones may be smaller than that of the corresponding virtual key.

Moreover, area rates of the sensing zones of the virtual keys may be different from one another per virtual key, and area rates of the sensing zones of the virtual keys may be different from one another per key type.

For example, an area rate of the corresponding sensing zone to the first key may be 60%, and an area rate of the corresponding sensing zone to the second key may be 70%. Also, an area rate of the corresponding sensing zone to the virtual key in the English virtual key pad may be 70%, and an area rate of the corresponding sensing zone to the virtual key in the number virtual key pad may be 80%.

Also, as a setting command signal of the sensing zone is input from the user, the controller 180 can set an area or position of the sensing zone to correspond to the input setting command signal.

In this case, the setting command signal may be input through the user input unit 130, and the touch screen 151 may be an example of the user input unit 130. The setting command signal may be input with respect to each of the plurality of virtual keys included in the virtual key pad (see FIG. 7C and FIG. 7D) as well as the virtual key pad (see FIG. 7B). This will be described in more detail with reference to FIG. 7A to FIG. 7D.

Referring to FIG. 7A, if a menu zone 701 is touched from the user (a), the mobile terminal 100 can display a menu item list 710(a).

In this case, the menu item list 710 may include a menu item 711 corresponding to virtual key pad control.

If the menu item 711 corresponding to virtual key pad control is selected from the menu item list 710 illustrated in FIG. 7a(b), the mobile terminal 100 can set a possible setting state of the sensing zone on the virtual key pad.

Referring to FIG. 7B(a), the mobile terminal 100 can display a window 720 for directly inputting an area rate of the individual sensing zone on the virtual key from the user. Accordingly, the user can input a desired area rate (for example, 80%) through the window 720.

Referring to FIG. 7B(b), supposing that the sensing zone includes four horizontal lines, the mobile terminal 100 can display a window 730 for inputting an area rate per horizontal line from the user.

For example, supposing that an area rate of 2:3:3:2 is set for the first to fourth lines, 2, 3, 3, and 2 can be allocated to the first to fourth lines, respectively, if a vertical line has a length of 10.

Figure 7C:
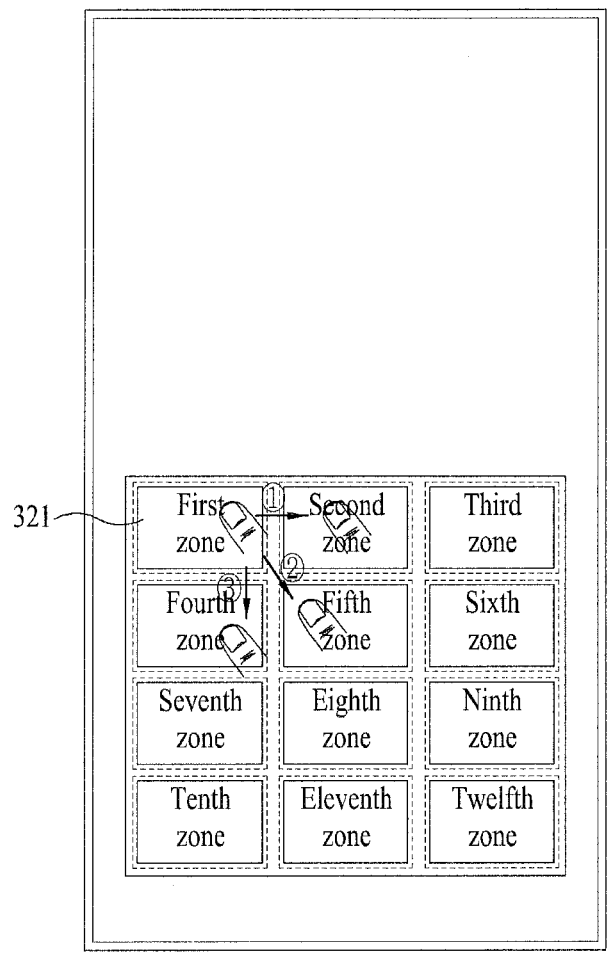

Referring to FIG. 7C, the mobile terminal 100 can display a plurality of individual sensing zones, and can allow the user to directly input an area setting signal of a specific one of the plurality of individual sensing zones. Hereinafter, the specific individual sensing zone will be limited to the first sensing zone 321.

Figure 7D:
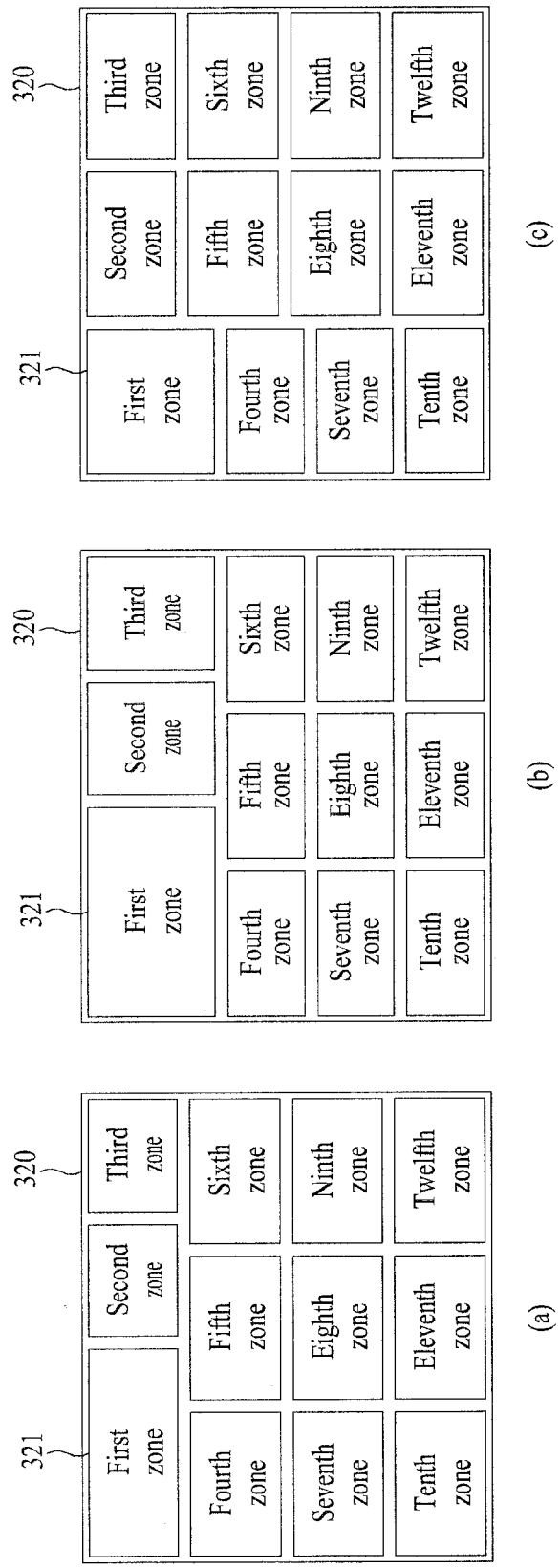

Referring to FIG. 7D(a), if a touch drag action in a right direction at a point of the first sensing zone 321 is input in FIG. 7C (①), the mobile terminal 100 can enlarge the area of the first sensing zone 321 in a right direction. At this time, areas of the second and third sensing zones arranged in the same horizontal line as that of the first sensing zone 321 can be changed relatively.

Referring to FIG. 7D(b), if a touch drag action in a right downward direction (or diagonal direction) at a point of the first sensing zone 321 is input in FIG. 7C (②), the mobile terminal 100 can enlarge the area of the first sensing zone 321 in a right direction and downward direction. At this time, areas of other sensing zones can be changed to correspond to the enlarged area of the first sensing zone 321.

Referring to FIG. 7D(c), if a touch drag action in a downward direction at a point of the first sensing zone 321 is input in FIG. 7C (③), the mobile terminal 100 can enlarge the area of the first sensing zone 321 in a downward direction. At this time, areas of the fourth, seventh and eleventh sensing zones arranged in the same vertical line as that of the first sensing zone 321 can be reduced relatively changed to correspond to the enlarged area of the first sensing zone 321.

In FIG. 7D, the area of the first sensing zone can be enlarged in proportional to a touch drag distance or touch drag speed.

Moreover, in FIG. 7C, the mobile terminal 100 can allow the user to directly input a position setting signal of a specific individual sensing zone, or can set a position of a specific individual sensing zone in accordance with the input position setting signal.

In the mean time, although not shown, the controller 180 can control display of the virtual key pad in accordance with the sensing zone set in FIG. 7A to FIG. 7D.

For example, the controller 180 can enlarge or reduce the area of the corresponding virtual key in proportional to the enlarged area or reduced area of the individual sensing zone. Also, the controller 180 can change the display position of the corresponding virtual key as the position of the individual sensing zone is changed.

Returning to FIG. 6, the mobile terminal 100 identifies a touch pattern of a touch action of each of the plurality of virtual keys under the control of the controller 180 (S630).

In this case, the controller 180 can sense, through the sensing zone, that a touch action of which one of the plurality of virtual keys has been input, and can identify a touch pattern of the sensed touch action.

For example, the touch pattern can include at least one of a touch area, a touch pressure, a position of a touch point, a touch type, and capacitance strength during the touch action of each of the plurality of virtual keys.

The mobile terminal 100 changes at least one of the area and position of the sensing zone (hereinafter, individual sensing zone) corresponding to each of the plurality of virtual keys to correspond to the identified touch pattern under the control of the controller 180 (S640).

If the mobile terminal 100 changes at least one of the area and position of a specific one of the plurality of virtual keys in the step S640, it can change an area or position of at least one virtual key arranged in the periphery of the specific virtual key under the control of the controller 180.

Also, the mobile terminal 100 cannot change the area or position of the corresponding virtual key even though it changes the area or position of the individual sensing zone in the step S640, whereby the area or position of the individual sensing zone can be different from that of the corresponding virtual key. The area or position of the corresponding virtual key may be changed to correspond to the changed area or position of the individual sensing zone, as the case may be.

Also, if a touch action of a specific virtual key is input under the control of the controller 180 in the step S640, the mobile terminal 100 can change the area of the individual sensing zone corresponding to the specific virtual key in proportional to the touch area or the touch pressure of the input touch action. Instead of the touch area or the touch pressure, the capacitance change level may be used.

In more detail, according to the first case, the mobile terminal 100 can store a touch action history of each of the plurality of virtual keys in the memory 160, and can change the individual sensing zone of each of the plurality of virtual keys based on the stored touch action history. In this case, the touch action history can include a touch area or touch pressure of the touch action input for a certain time period in respect of each of the plurality of virtual keys, or can include a touch area or touch pressure of the touch action of a certain number of times input for each of the plurality of virtual keys.

In more detail, according to the second case, the mobile terminal 100 can change the area of the individual sensing zone of each of the plurality of virtual keys of which touch action is input, in proportional to the touch area or the touch pressure during the touch action. In this case, the area of the individual sensing zone of the virtual key may be set differently whenever the touch action is input.

Hereinafter, a process of changing a corresponding sensing zone to correspond to a touch area of a virtual key will be described with reference to FIG. 8A and FIG. 8B.

Figure 8A:
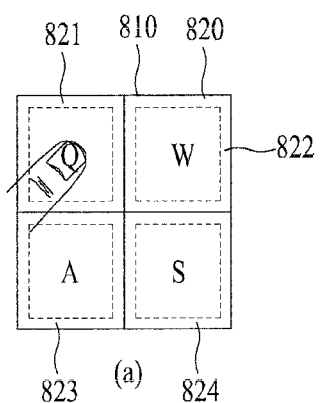
FIG. 8A and FIG. 8B are screen schematic views illustrating that a sensing area is changed to correspond to a touch area of a virtual key in accordance with the present invention.
Figure 8A:
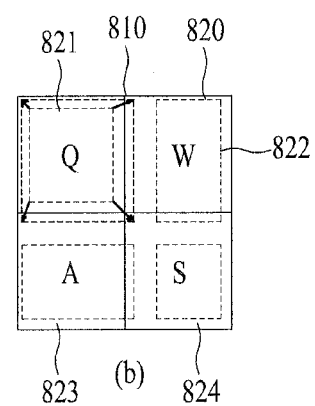

Referring to FIG. 8A, the mobile terminal 100 can receive a touch action having a touch area more than a certain reference with respect to a Q key of a virtual key pad 810 (*a*).

The mobile terminal 100 can enlarge the area of the individual sensing zone 821 corresponding to the Q key in proportional to the touch area of the received touch action (b). At this time, the mobile terminal 100 can reduce the areas of the other individual sensing zones 822 to 824 to correspond to the enlarged individual sensing zone 821.

In other words, if the touch area of the touch action input for a specific virtual key is more than a certain reference, the mobile terminal 100 can enlarge the area of the individual sensing zone corresponding to the specific virtual key to reach a certain size.

Figure 8B:
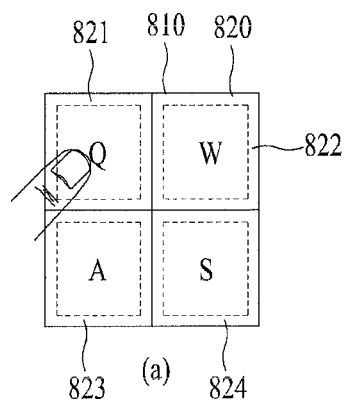
Figure 8B:
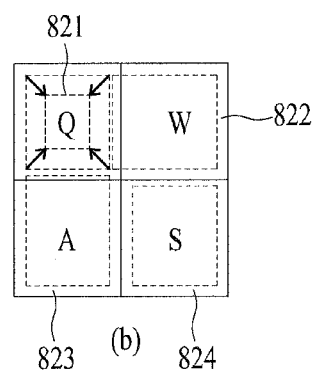

Referring to FIG. 8B, the mobile terminal 100 can receive a touch action having a touch area less than a certain reference with respect to the Q key of the virtual key pad 810 (a).

The mobile terminal 100 can reduce the area of the individual sensing zone 821 corresponding to the Q key in proportional to the touch area of the received touch action (b). At this time, the mobile terminal 100 can enlarge the areas of the other individual sensing zones 822 to 824 to correspond to the reduced individual sensing zone 821.

In other words, if the touch area of the touch action input for a specific virtual key is less than a certain reference, the mobile terminal 100 can reduce the area of the individual sensing zone corresponding to the specific virtual key to reach a certain size.

Alternatively, the mobile terminal 100 can previously store an area (or area rate) of the individual sensing zone per touch area in the memory 160 and identify the touch area during the touch action of the specific virtual key to change the individual sensing zone, thereby having an area corresponding to the identified touch area. For example, in addition to the touch area, the touch pressure, the capacitance change level, and the touch type may be used.

Returning to FIG. 6, if a plurality of touch actions are input for a specific one of the plurality of virtual keys in the step S640, the mobile terminal 100 identifies a position of a plurality of touch points of the plurality of touch actions under the control of the controller 180 and, as a result, changes at least one of the area and position of the individual sensing zone corresponding to the specific virtual key to include the position of the plurality of touch points. In this case, the plurality of touch actions may be input for a certain time period (similar to the aforementioned touch action history).

In more detail, the controller 180 can change the area or position of the individual sensing zone to include a high touch zone of zones that include the plurality of touch points. Alternatively, if the plurality of touch points are mainly distributed at the right of the individual sensing zone, the controller 180 can move the position of the individual sensing zone to the right or enlarge the right area.

Also, if a touch action is input for a point of a specific virtual key in the step S640, the mobile terminal 100 can move the position of the individual sensing zone of the specific virtual key based on the point for the touch action under the control of the controller 180.

Hereinafter, a process of changing a corresponding sensing zone to correspond to a touch point of a virtual key will be described with reference to FIG. 9A and FIG. 9B.

Figure 9A:
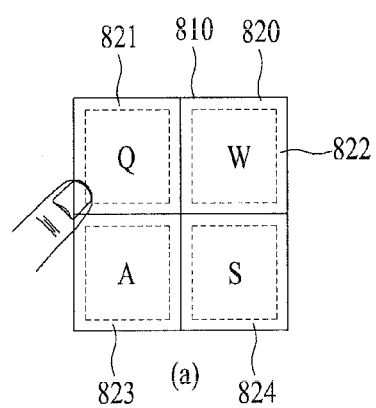
FIG. 9A and FIG. 9B are screen schematic views illustrating that a sensing area is changed to correspond to a touch point of a virtual key in accordance with the present invention.
Figure 9A:
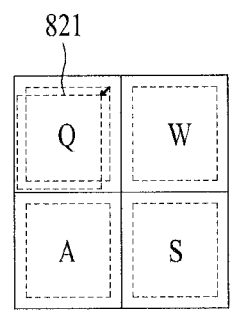

Referring to FIG. 9A, the mobile terminal 100 can receive a touch action of a point located at a lower left within the Q key of the virtual key pad 810 (*a*).

As the touch action is input for the point located at a lower left within the Q key, the mobile terminal 100 can move the individual sensing zone 821 of the Q key in a lower left direction at a certain distance.

In the mean time, although not shown, as the touch action is input for the point located at a lower left within the Q key, the mobile terminal 100 can enlarge the area of the individual sensing zone 821 of the Q key in a lower left direction at a certain size.

Figure 9B:
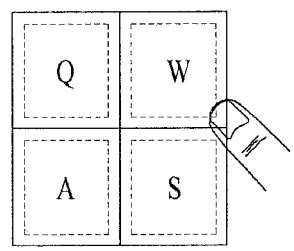
Figure 9B:
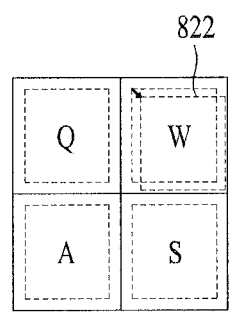

Referring to FIG. 9B, the mobile terminal 100 can receive a touch action of a point located at a lower right within a W key of the virtual key pad 810 (*a*).

As the touch action is input for the point located at a lower right within the W key, the mobile terminal 100 can move the individual sensing zone 822 of the W key in a lower right direction at a certain distance.

In the mean time, although not shown, as the touch action is input for the point located at a lower right within the W key, the mobile terminal 100 can enlarge the area of the individual sensing zone 822 of the W key in a lower right direction at a certain size.

In FIG. 9A and FIG. 9B, a position movement range of the individual sensing zone may be within the display zone of the corresponding virtual key, or may depart from the display zone of the corresponding virtual key. In particular, if the position movement range of the individual sensing zone departs from the display zone of the corresponding virtual key, the area or position of the individual sensing zone corresponding to the virtual key from which the display zone departs may be changed.

Returning to FIG. 6, the controller 180 may change the position or area of the individual sensing zone depending on whether a display direction of the mobile terminal is a horizontal direction or a vertical direction, or may change the position or area of the individual sensing zone depending on a key pad type.

For example, the controller 180 can set the individual sensing zone longitudinally in a horizontal direction (or vertical direction) by considering that the virtual key is displayed longitudinally in a horizontal direction (or vertical direction) if the display direction of the mobile terminal is a horizontal direction (or vertical direction). The controller 180 can set the area rate of the individual sensing zone of the virtual key to 60% with respect to the English virtual key pad, and can set the area rate of the individual sensing zone of the virtual key to 70% with respect to the Korean virtual key pad.

Moreover, the controller 180 may change the area or position of the corresponding virtual key to correspond to the changed area or position of the individual sensing zone in the step S640.

For example, if the area of the first sensing zone of the virtual key is enlarged from 80% to 110%, the controller 180 can enlarge the display area of the first virtual key at a certain rate. Also, if the position of the first sensing zone of the virtual key is moved to a lower right direction, the controller 180 can move the position of the first virtual key towards the lower right direction.

If a touch action is input for a specific one of the plurality of virtual keys included in the displayed virtual key pad under the control of the controller 180, the mobile terminal 100 can generate key data corresponding to the specific virtual key for the touch action under the control of the controller 180 (S650).

At this time, the touch action on the specific virtual key can be sensed by the sensing zone corresponding to the specific virtual key.

Moreover, the mobile terminal 100 can display information corresponding to the generated key data on the touch screen 151 under the control of the controller 180.

For example, if the specific virtual key is a Q key, a big letter "Q" corresponding to key data "Q" or a small letter "q" may be displayed. If the specific virtual key is a key to which a number corresponding to a specific menu item is allocated, a function (or action) corresponding to the specific menu item may be performed and a screen corresponding to the performed function may be displayed.

In the mean time, if a touch action is input for a point between two neighboring virtual keys of the plurality of virtual keys, the mobile terminal 100 may not generate any key data under the control of the controller 180.

In more detail, the first and second individual sensing zones can be set in the first and second neighboring virtual keys, and the areas of the first and second individual sensing zones may be set to be smaller than the display area of each of the first and second virtual keys. Accordingly, if a touch action is received for a point between the first and second virtual keys, i.e., a point where the sensing zone is not set, the mobile terminal 100 may not generate any key data.

Alternatively, if the touch action is sensed in the first and second individual sensing zones by the touch action on the point between the first and second virtual keys, the mobile terminal 100 may not generate any key data.

Moreover, if the touch action is input for the point between the first and second virtual keys, the mobile terminal 100 may generate key data of the previously designated one of the first and second virtual keys.

This will be described in more detail with reference to FIG. 10A and FIG. 10B.

Figure 10A:
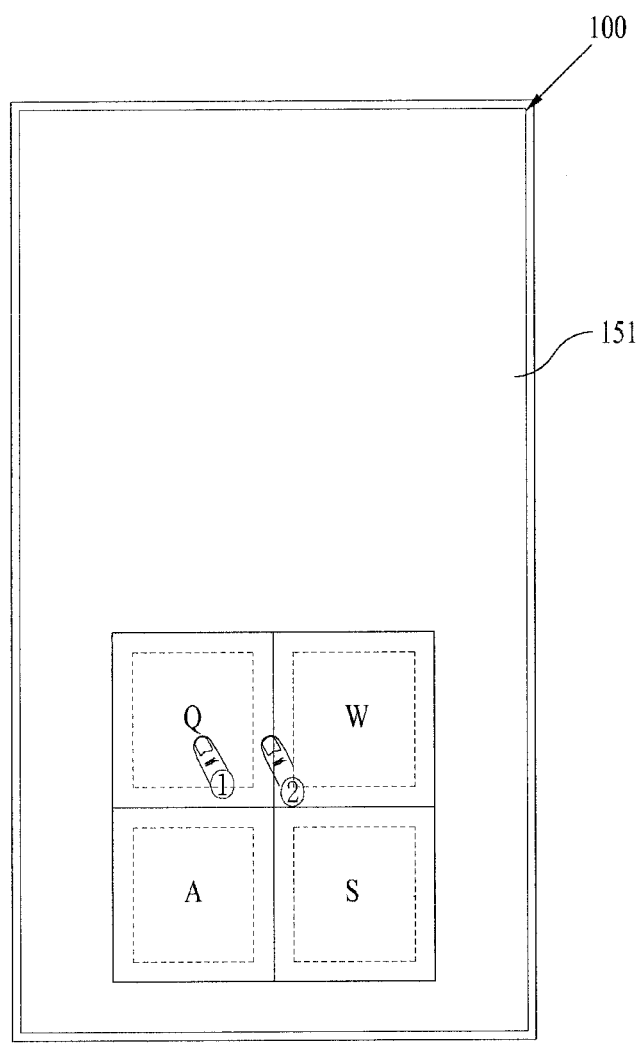
FIG. 10A and FIG. 10B are screen schematic views illustrating that key data are generated depending on virtual key selection in accordance with the present invention.

Referring to FIG. 10A, the first touch action ① of the Q key can be input to the mobile terminal 100, and the second action ② of the point between the Q key and the W key can be input to the mobile terminal 100.

Figure 10B:
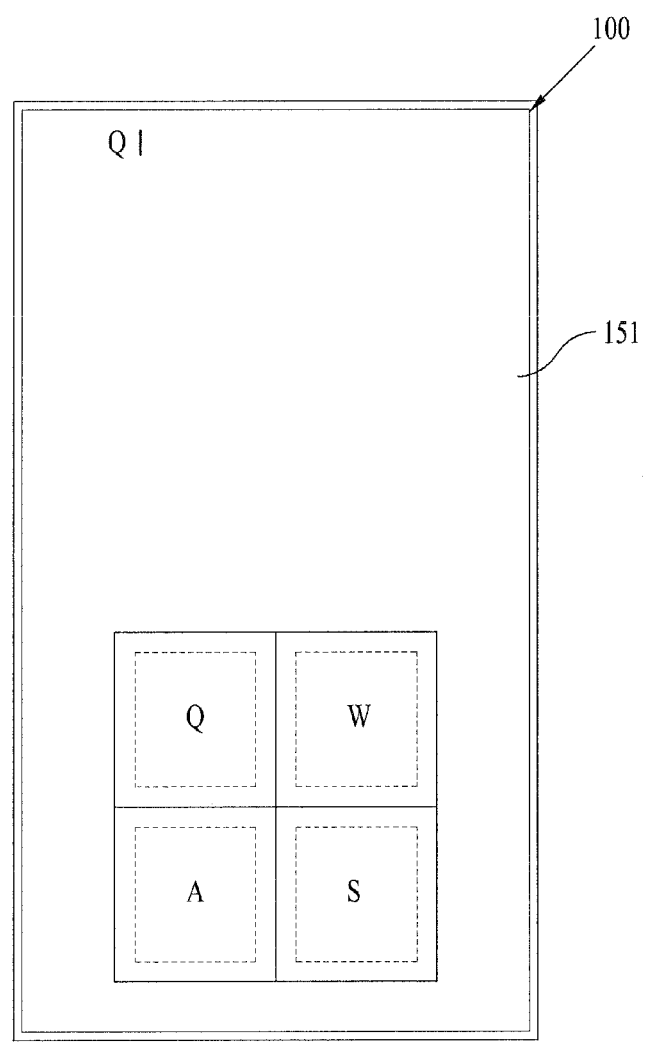

Referring to FIG. 10B, supposing that the first and second touch actions are sequentially input to the mobile terminal 100, the mobile terminal 100 generates key data "Q" through the first touch action to display the key data on the screen, whereas it does not generate any key data through the second touch action.

According to the present invention, the mobile terminal 100 displays at least one main virtual key on the touch screen 151 under the control of the controller 180, and if one point within a specific one of the at least one main virtual key is touched, the mobile terminal 100 displays a sub virtual key corresponding to the touched specific main virtual key at the touched point.

This will be described in more detail with reference to FIG. 11A to FIG. 11D, FIG. 12A to FIG. 12C, and FIG. 13A to FIG. 13C.

FIG. 11A to FIG. 11D illustrate that a main virtual key is a number key. For convenience of description, it is supposed that the main virtual key includes a 1 key 1110 and a 0 key 1120.

Figure 11A:
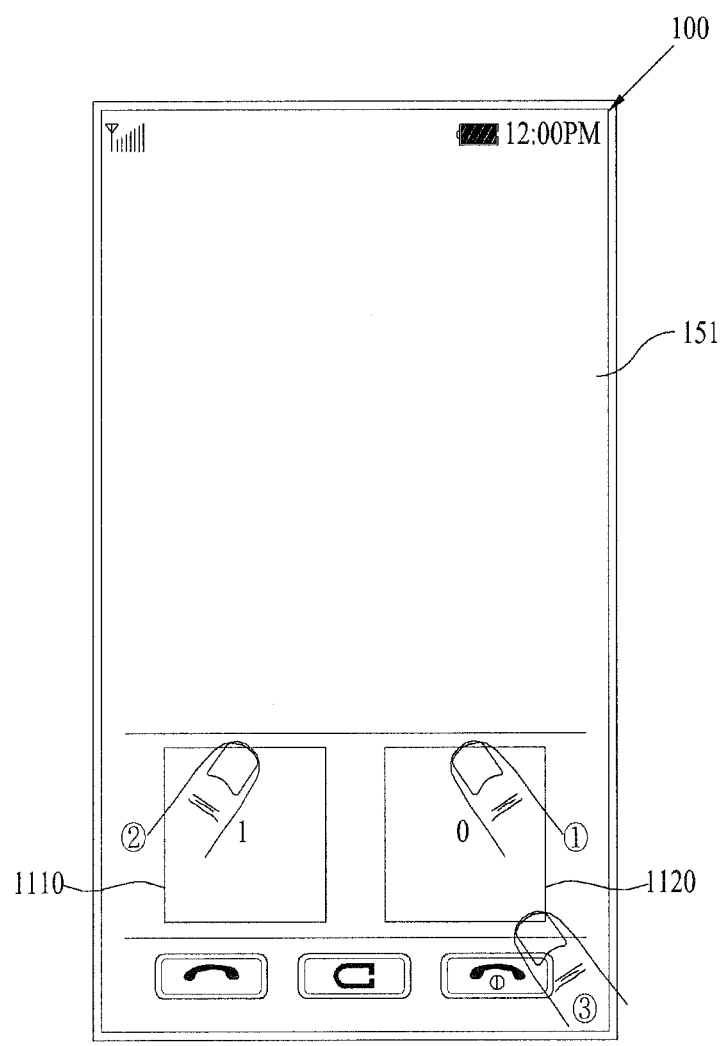
FIG. 11A to 11D are screen schematic views illustrating that a sub virtual key is displayed at a touch point of a main virtual key in accordance with one example of the present invention.

Referring to FIG. 11A, the user can input a touch action of one point within the 1 key 1110 or 0 key 1120.

Figure 11B:
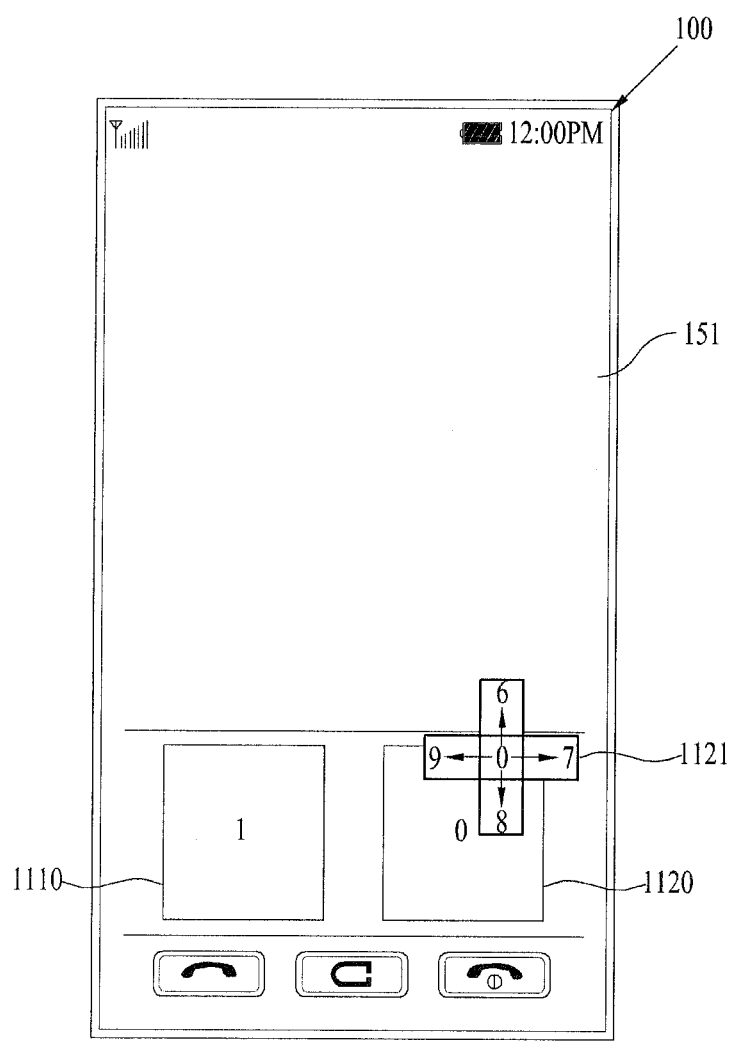

Referring to FIG. 11B, if the touch action is input for the first point within the 0 key 1120 in FIG. 11A (①), the mobile terminal 100 can display a sub virtual key 1121 corresponding to the 0 key 1120 at the first point.

In this case, the sub virtual key 1121 corresponding to the 0 key 1120 can include 6 key, 7 key, 8 key, 9 key and 0 key. In more detail, the 0 key corresponding to the main virtual key is located at the center of the sub virtual key 1121, the 6 key, the 7 key, the 8 key and the 9 key are located in due order clockwise based on the 0 key.

Moreover, if a touch action (or touch drag action) in an upward direction is input in FIG. 11B, the mobile terminal 100 can generate key data corresponding to the 6 key. If a touch action (or touch drag action) in a right direction is input in FIG. 11B, the mobile terminal 100 can generate key data corresponding to the 7 key. If a touch action (or touch drag action) in a downward direction is input in FIG. 11B, the mobile terminal 100 can generate key data corresponding to the 8 key. If a touch action (or touch drag action) in a left direction is input in FIG. 11B, the mobile terminal 100 can generate key data corresponding to the 9 key. If a touch action (or touch drag action) of the 0 key is input in FIG. 11B, the mobile terminal 100 can generate key data corresponding to the 0 key.

Moreover, in FIG. 11B, the mobile terminal can maintain display of the sub virtual key in a state that the touch of the first point is maintained, and can generate key data of the key corresponding to one direction as the touch action in one direction is input in a state that the touch of the first point is maintained (it is supposed that the touch action of the first point and the touch action in one direction are performed at one time without touch release). Also, the mobile terminal 100 can stop display of the sub virtual key if the touch of the first point is released while the sub virtual key is being displayed.

Figure 11C:
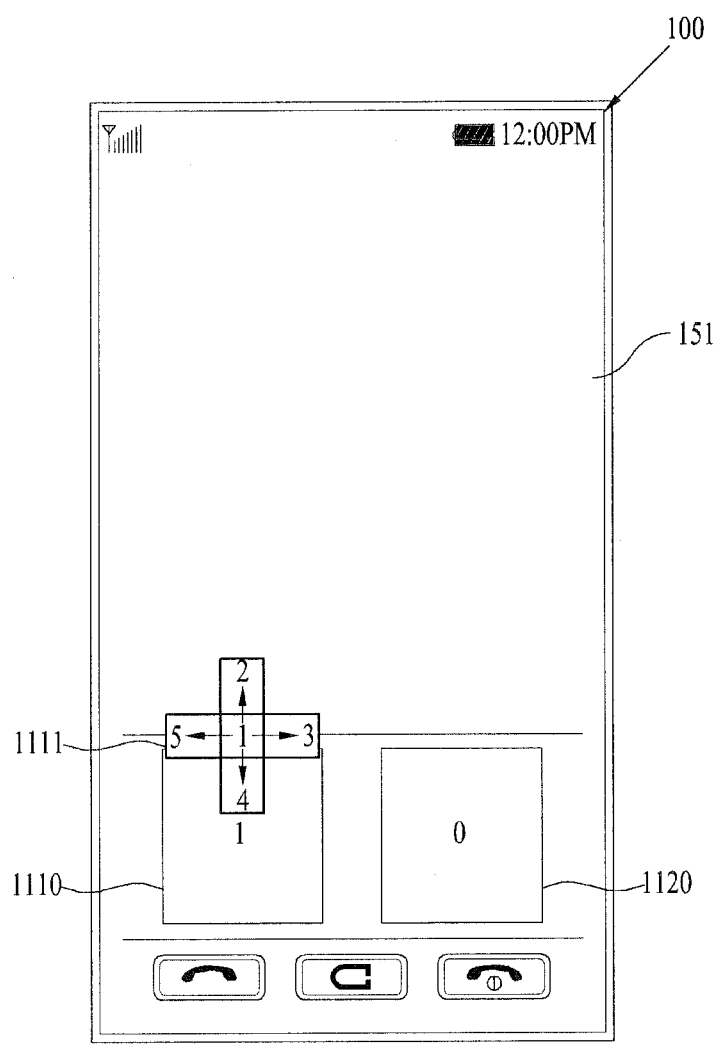

Referring to FIG. 11C, if a touch action is input for the second point within the 1 key 1110 in FIG. 11A (②), the mobile terminal 100 can display a sub virtual key 1111 corresponding to the 1 key 1110 at the second point.

In this case, the sub virtual key 1111 corresponding to the 1 key 1110 can include 1 key, 2 key, 3 key, 4 key and 5 key. In more detail, the 1 key corresponding to the main virtual key is located at the center of the sub virtual key 1111, the 2 key, the 3 key, the 4 key and the 5 key are located in due order clockwise based on the 1 key.

Moreover, if a touch action (or touch drag action) in an upward direction is input in FIG. 11C, the mobile terminal 100 can generate key data corresponding to the 2 key. If a touch action (or touch drag action) in a right direction is input in FIG. 11C, the mobile terminal 100 can generate key data corresponding to the 3 key. If a touch action (or touch drag action) in a downward direction is input in FIG. 11C, the mobile terminal 100 can generate key data corresponding to the 4 key. If a touch action (or touch drag action) in a left direction is input in FIG. 11C, the mobile terminal 100 can generate key data corresponding to the 5 key. If a touch action (or touch drag action) of the 1 key is input in FIG. 11C, the mobile terminal 100 can generate key data corresponding to the 1 key.

Figure 11D:
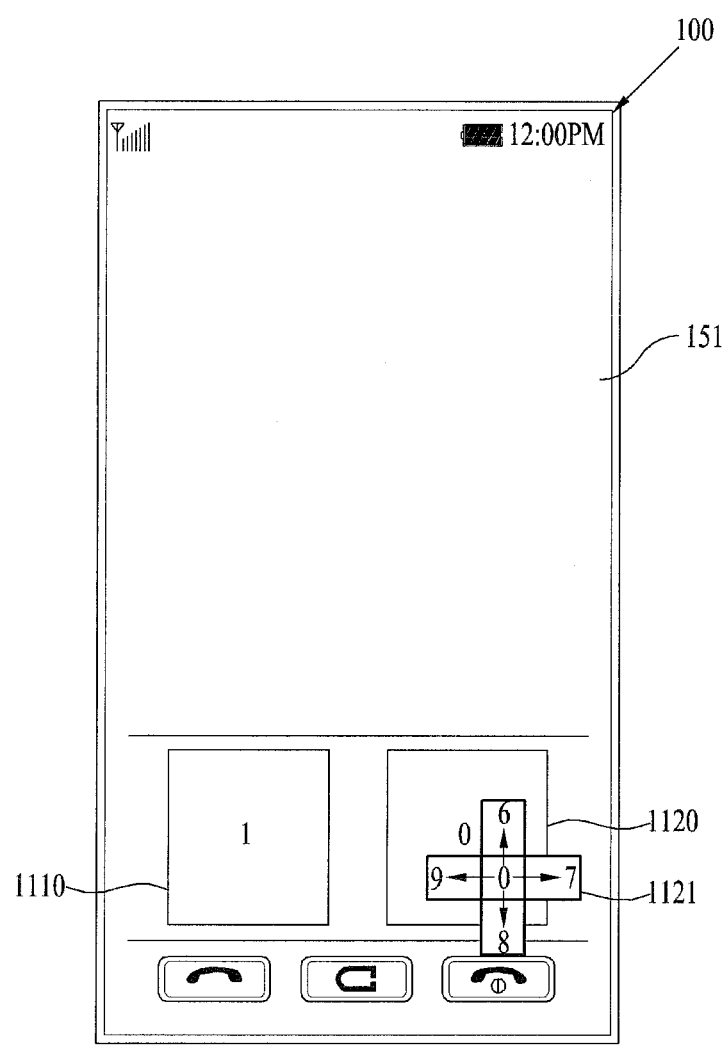

Referring to FIG. 11D, if a touch action is input for the third point within the 0 key 1120 in FIG. 11A (③), the mobile terminal 100 can display a sub virtual key 1121 corresponding to the 0 key 1120 at the third point. For the other description, refer to the description of FIG. 11B.

Figure 12A:
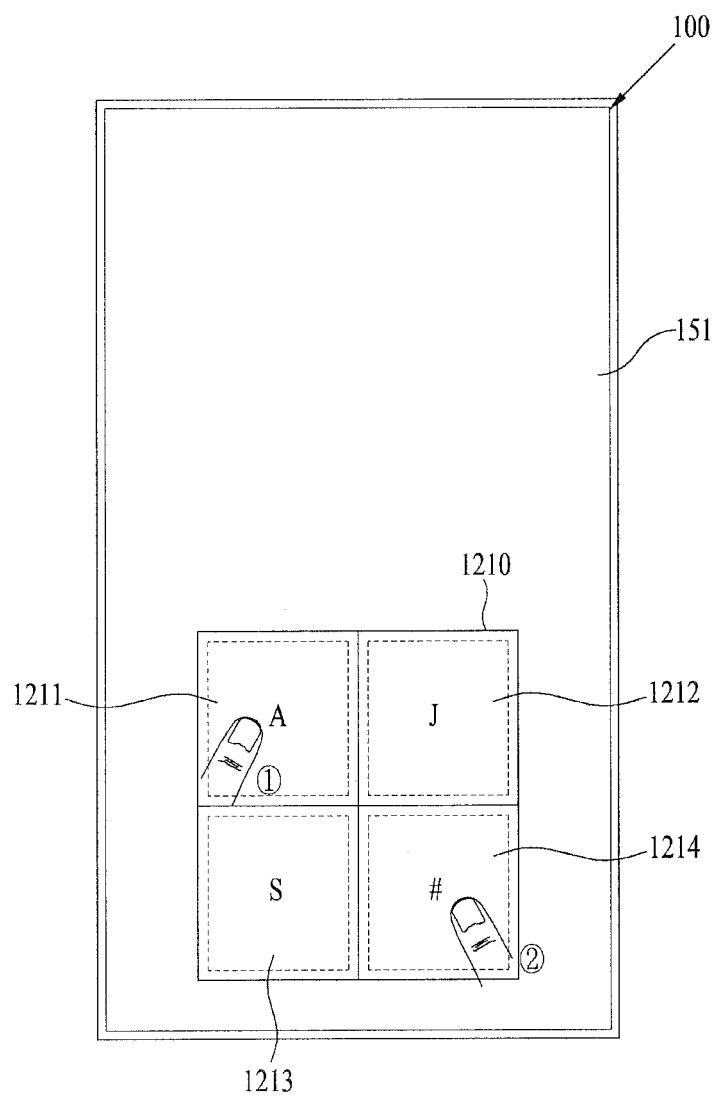
FIG. 12A to FIG. 12C are screen schematic views illustrating that a sub virtual key is displayed at a touch point of a main virtual key in accordance with one example of the present invention.
Figure 12B:
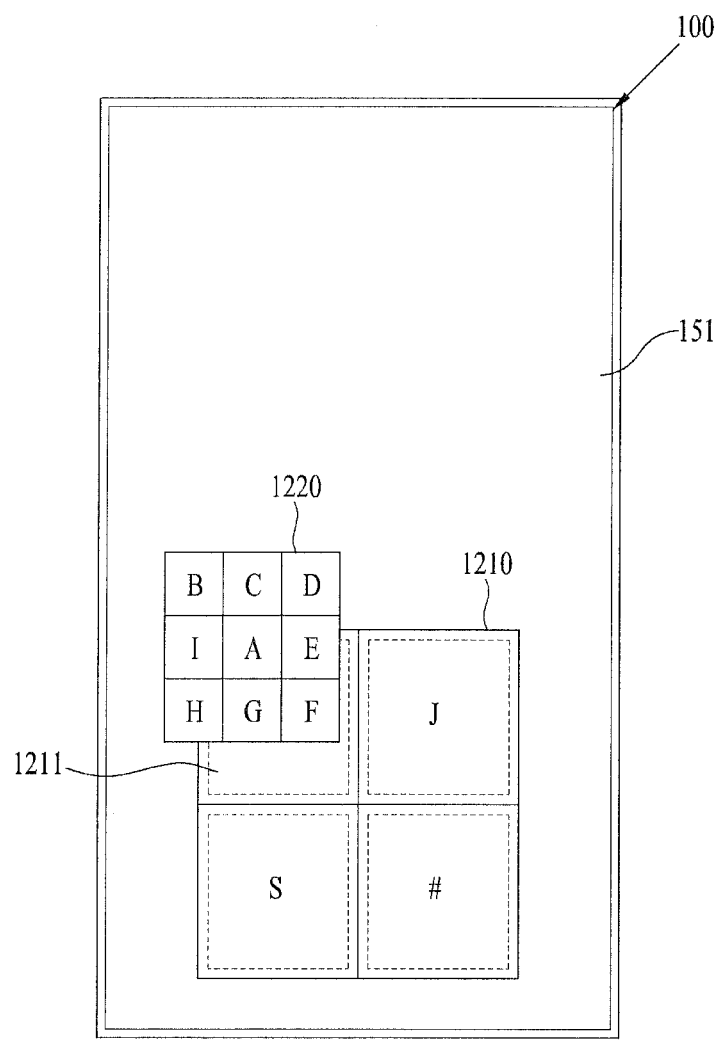
Figure 12C:
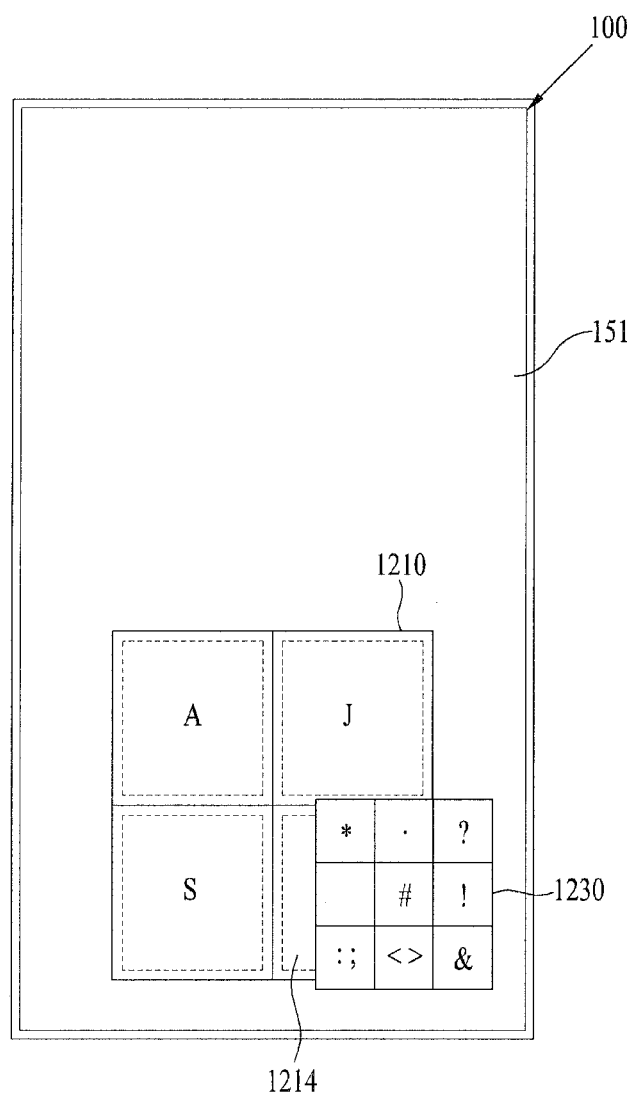

FIG. 12A to FIG. 12C illustrate that a main virtual key is an English key. For convenience of description, it is supposed that the main virtual key includes A key 1211, J key 1212, S key 1213, and # key 1214.

In this case, the main virtual key includes three alphabet groups (first group-A~I, second group-J~R, third group-S~Z) of a certain number in accordance with the alphabet order.

Referring to FIG. 12A, the mobile terminal 100 displays a plurality of main virtual keys 1211 to 1214, and a touch action of any one of the plurality of main virtual keys 1211 to 1214 is input from the user to the mobile terminal 100.

Referring to FIG. 12B, if a touch action is input for the first point within the A key 1211 in FIG. 12A, the mobile terminal 100 can display a sub virtual key 1220 corresponding to the A key 1211 at the first point.

For example, the sub virtual key 1220 corresponding to the A key 1211 can include a key corresponding to each of A~I of the first group. The A key can be located at the center of the sub virtual key 1220, and the other keys can be arranged clockwise in the alphabet order based on the A key.

Also, if a touch drag action to a specific key included in the sub virtual key 1220 is input or a touch action of the specific key is input in FIG. 12B, the mobile terminal 100 can generate key data corresponding to the specific key.

Moreover, the mobile terminal 100 can maintain display of the sub virtual key 1220 in a state that the touch of the first point is maintained, and can generate key data of the key corresponding to one direction as the touch action in one direction is input in a state that the touch of the first point is maintained. Also, the mobile terminal 100 can stop display of the sub virtual key 1220 if the touch of the first point is released while the sub virtual key 1220 is being displayed.

Referring to FIG. 12C, if a touch action is input for the second point within the # key 1214 in FIG. 12A, the mobile terminal 100 can display a sub virtual key 1230 corresponding to the # key 1214 at the second point.

For example, the sub virtual key 1230 corresponding to the # key 1214 can include keys corresponding to *, ., ?, !, &, < >, ;:. The # key can be located at the center of the sub virtual key 1230, and the other keys can be arranged clockwise based on the # key.

Also, if a touch drag action to a specific key included in the sub virtual key 1230 is input or a touch action of the specific key is input in FIG. 12C, the mobile terminal 100 can generate key data corresponding to the specific key.

Figure 13A:
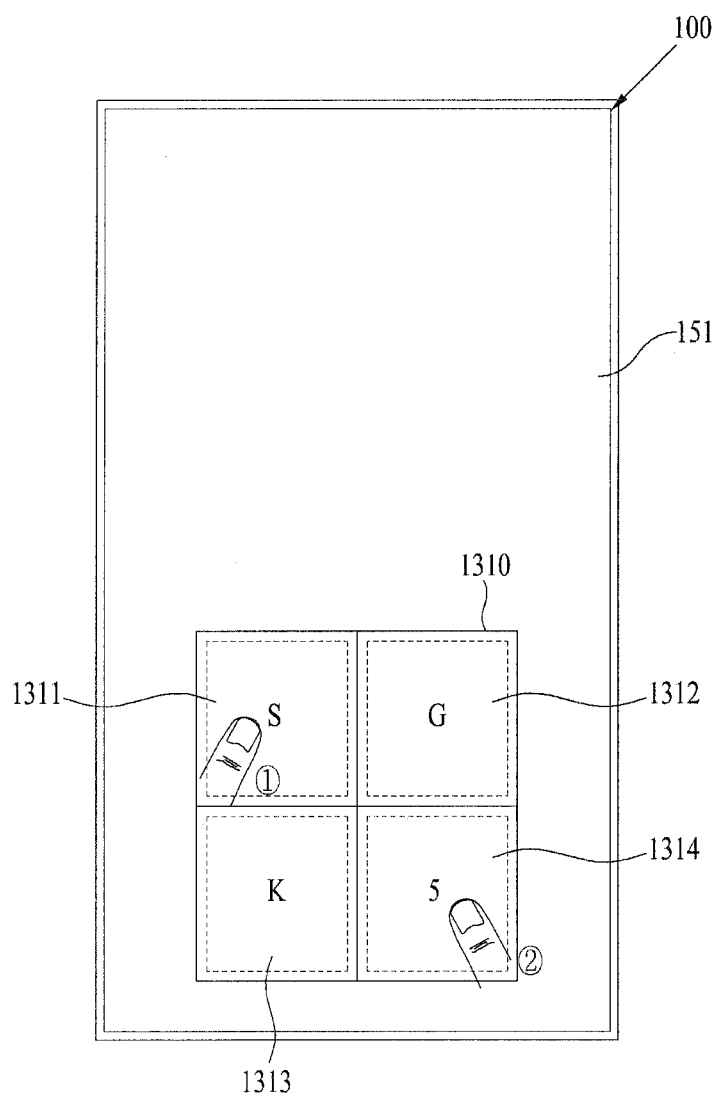
FIG. 13A to FIG. 13C are screen schematic views illustrating that a sub virtual key is displayed at a touch point of a main virtual key in accordance with one example of the present invention.
Figure 13B:
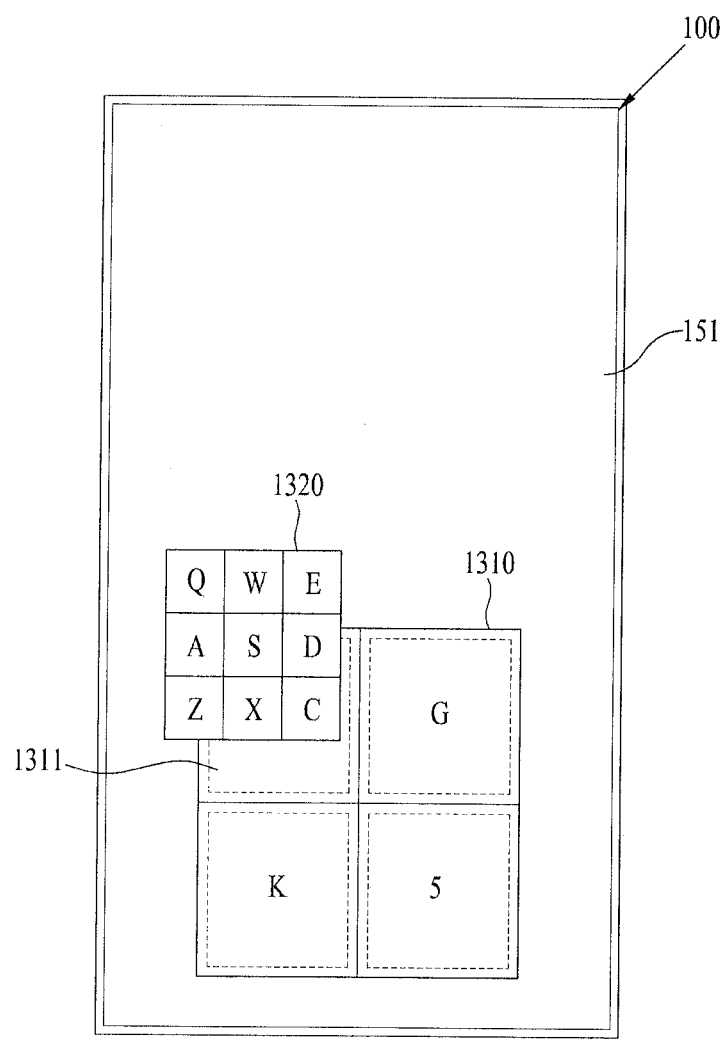
Figure 13C:
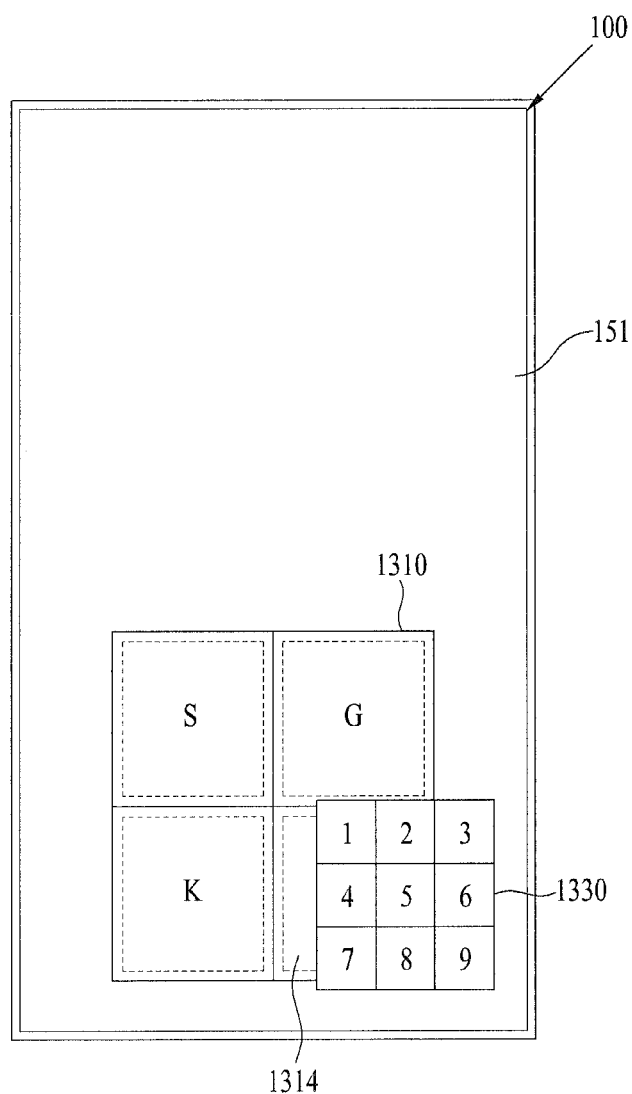

FIG. 13A to FIG. 13C illustrate that a main virtual key is an English key. For convenience of description, it is supposed that the main virtual key includes S key 1311, G key 1312, K key 1313, and 5 key 1314.

In this case, the main virtual key can be configured in such a manner that keys corresponding to three horizontal lines*three vertical lines (a total of nine lines) are grouped in a direction from the left to the right of a QWERTY key in accordance with a structure of the QWERTY key, whereby the keys arranged at the center of each group within the QWERTY key can be designated as the main virtual keys.

Referring to FIG. 13A, the mobile terminal 100 displays a plurality of main virtual keys 1311 to 1314, and a touch action of any one of the plurality of main virtual keys 1311 to 1314 is input from the user to the mobile terminal 100.

Referring to FIG. 13B, if a touch action is input for the first point within the S key 1311 in FIG. 13A, the mobile terminal 100 can display a sub virtual key 1320 corresponding to the S key 1311 at the first point.

For example, the sub virtual key 1320 corresponding to the S key 1311 can include eight keys Q, W, E, D, C, X, Z, A based on the QWERTY key, wherein the eight keys are arranged based on the S key including the S key. The structure of the sub virtual key 1320 reflects the structure of the QWERTY key.

Also, if a touch drag action to a specific key included in the sub virtual key 1320 is input or a touch action of the specific key is input in FIG. 13B, the mobile terminal 100 can generate key data corresponding to the specific key.

Moreover, the mobile terminal 100 can maintain display of the sub virtual key 1320 in a state that the touch of the first point is maintained, and can generate key data of the key corresponding to one direction as the touch action in one direction is input in a state that the touch of the first point is maintained. Also, the mobile terminal 100 can stop display of the sub virtual key 1320 if the touch of the first point is released while the sub virtual key 1320 is being displayed.

Referring to FIG. 13C, if a touch action is input for the second point within the 5 key 1314 in FIG. 13A, the mobile terminal 100 can display a sub virtual key 1330 corresponding to the 5 key 1314 at the second point.

For example, the sub virtual key 1330 corresponding to the 5 key 1314 can include keys corresponding to 1 to 9. The 5 key can be located at the center of the sub virtual key 1330, and the other keys can be arranged clockwise based on the 5 key.

Also, if a touch drag action to a specific key included in the sub virtual key 1330 is input or a touch action of the specific key is input in FIG. 13C, the mobile terminal 100 can generate key data corresponding to the specific key.

According to one embodiment of the present invention, the above-described virtual key pad controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The mobile terminal according to at least one embodiment of the present invention configured as above and the method for controlling a virtual key pad thereof have the following advantages.

First of all, since the sensing zone corresponding to the virtual key pad can be set considering the touch pattern of the user, an error in user manipulation of the virtual key pad can be reduced.

Second, since the display area of the virtual key is set to be different from the area of the corresponding sensing zone, the sensing zone can be set considering the point of the virtual key, which is actually touched by the user.

Finally, if the point between the neighboring virtual keys is touched, since no key data are generated, the user may not generate unwanted key data.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A mobile terminal comprising:
   a touch screen; and
   a controller configured to:
   display a virtual key pad including a plurality of virtual keys on the touch screen, and
   receive a touch action on one of the plurality of virtual keys via the touch screen
   wherein when one of the plurality of virtual keys is selected via the touch action, the controller displays a plurality of additional virtual keys adjacent to the selected virtual key,
   wherein the plurality of additional virtual keys includes a first additional virtual key that has an identifier that is the same as the selected virtual key and at least one second additional virtual key that does not have an identifier that is the same as that of the plurality of virtual keys, wherein the touch screen has a sensing zone corresponding to each of the plurality of virtual keys to sense a touch action of each of the plurality of virtual keys, and wherein the controller is configured to:

identify a touch pattern of the touch action on one of the plurality of virtual keys; and change at least one of an area or position of the sensing zone corresponding to the touched virtual key to correspond to the identified touch pattern, wherein at least one of the area or position of the sensing zone of the touched virtual key is different from at least one of an area or position of the touched virtual key, and wherein the area of the sensing zone of the touched virtual key is equal to or smaller than that of the touched virtual key.

2. The mobile terminal as claimed in claim 1, wherein the controller does not generate corresponding key data if a touch action is input on a point between two neighboring virtual keys of the plurality of virtual keys.

3. The mobile terminal as claimed in claim 1, wherein the controller changes at least one of an area or position of at least one virtual key located in the periphery of a specific virtual key of the plurality of virtual keys if it changes at least one of an area or position of the specific virtual key.

4. The mobile terminal as claimed in claim 1, wherein the touch pattern includes at least one of a touch area, a touch pressure, a touch point or a touch type during a touch action.

5. The mobile terminal as claimed in claim 4, wherein, if a touch action is input on a specific one of the plurality of virtual keys, the controller changes an area of a sensing zone corresponding to the specific virtual key in proportion to at least one of the touch area or the touch pressure of the input touch action.

6. The mobile terminal as claimed in claim 1, wherein the touch pattern includes a position of a touch point by a pointer during the touch action.

7. The mobile terminal as claimed in claim 6, wherein, if a plurality of touch actions are input on a specific one of the plurality of virtual keys, the controller identifies a position of a plurality of touch points based on the plurality of touch actions and changes at least one of an area or position of a sensing zone corresponding to the specific virtual key to include the position of the plurality of touch points as a result of identifying.

8. The mobile terminal as claimed in claim 1, further comprising:

a user input unit inputting a setting command signal of the sensing zone corresponding to each of the plurality of virtual keys, wherein the controller sets an area and position of the sensing zone corresponding to each of the plurality of virtual keys in accordance with the input setting command signal.

9. A method for controlling a virtual key pad of a mobile terminal, the method comprising the steps of:

displaying a virtual key pad including a plurality of virtual keys on a touch screen;

receiving a touch action on one of the plurality of virtual keys via the touch screen, wherein when one of the plurality of virtual keys is selected via the touch action, the method further comprises displaying a plurality of additional virtual keys adjacent to the selected virtual key, wherein the plurality of additional virtual keys includes a first additional virtual key that has an identifier that is the same as the selected virtual key and at least one second additional virtual key that does not have an identifier that is the same as that of the plurality of virtual keys;

setting a sensing zone corresponding to each of the plurality of virtual keys to sense a touch action on one of the plurality of virtual keys;

identifying a touch pattern of the touch action on one of the plurality of virtual keys if the touch action is input; and changing at least one of an area or position of the sensing zone corresponding to the touched virtual key to correspond to the identified touch pattern, and wherein at least one of the area or position of the sensing zone of the touched virtual key is different from at least one of an area or position of the touched virtual key.

10. The method as claimed in claim 9, wherein the changing step includes changing at least one of an area or position of at least one virtual key located in the periphery of a specific virtual key of the plurality of virtual keys if at least one of an area or position of the touched virtual key is changed.

11. The method as claimed in claim 10, wherein if a touch action is input on the specific virtual key, the identifying step includes identifying at least one of a touch area or a touch pressure of the input touch action, and the changing step includes changing an area of a sensing zone corresponding to the specific virtual key in proportion to at least one of the identified touch area or the identified touch pressure.

12. The method as claimed in claim 10, wherein if a touch action is input on the specific virtual key, the identifying step includes identifying a position of a touch point by a pointer that inputs the touch action, and the changing step includes changing at least one of an area or position of the sensing zone to correspond to the identified position of the touch point.

13. The method as claimed in claim 12, wherein, if a plurality of touch actions are input on the specific virtual key, the identifying step includes identifying a position of a plurality of touch points based on the plurality of touch actions, and the changing step includes changing at least one of an area or position of a sensing zone corresponding to the specific virtual key to include the identified position of the plurality of touch points.

14. The method as claimed in claim 10, further comprising the steps of:

inputting a setting command signal of the sensing zone corresponding to each of the plurality of virtual keys; and setting an area and position of the sensing zone corresponding to each of the plurality of virtual keys in accordance with the input setting command signal.

* * * * *